(12) United States Patent
Pruitt et al.

(10) Patent No.: US 7,661,253 B2
(45) Date of Patent: Feb. 16, 2010

(54) MODULAR ROTARY CUTTERBAR

(75) Inventors: Martin E. Pruitt, Hesston, KS (US);
Brendon Nafziger, Canton, KS (US);
Stanley R. Clark, Hesston, KS (US)

(73) Assignee: AGCO Corporation, Hesston, KS (US)

( * ) Notice: Subject to any disclaimer, the term of this patent is extended or adjusted under 35 U.S.C. 154(b) by 42 days.

(21) Appl. No.: 11/960,056

(22) Filed: Dec. 19, 2007

(65) Prior Publication Data

US 2009/0158699 A1    Jun. 25, 2009

(51) Int. Cl.
*A01D 34/00*    (2006.01)

(52) U.S. Cl. ............................................. 56/13.6; 56/6

(58) Field of Classification Search ........................ 56/6, 56/13.6, 255, 295, DIG. 20, DIG. 24
See application file for complete search history.

(56) References Cited

U.S. PATENT DOCUMENTS

| | | | | |
|---|---|---|---|---|
| 593,505 A * | 11/1897 | Zern et al. | ................... | 238/190 |
| 3,469,378 A * | 9/1969 | Heesters et al. | .............. | 56/11.9 |
| 3,513,648 A * | 5/1970 | Kline et al. | ................... | 56/13.6 |
| 4,103,476 A * | 8/1978 | Oosterling et al. | ........... | 56/13.6 |
| 4,468,916 A | 9/1984 | Vissers et al. | | |
| 4,497,161 A * | 2/1985 | Vissers et al. | ................. | 56/13.6 |
| 4,709,540 A * | 12/1987 | Collart | ........................ | 56/13.6 |
| 4,761,940 A * | 8/1988 | Wolff | .......................... | 56/13.6 |
| 4,763,463 A * | 8/1988 | Ermacora et al. | ........... | 56/13.6 |
| 4,922,693 A * | 5/1990 | Neuerburg | ................... | 56/13.6 |
| 4,986,060 A | 1/1991 | Walters et al. | | |
| 5,012,635 A | 5/1991 | Walters et al. | | |
| 5,463,857 A * | 11/1995 | Blosser | ........................ | 56/238 |
| 5,784,866 A * | 7/1998 | Campbell et al. | ................ | 56/6 |
| 5,875,619 A | 3/1999 | McLean et al. | | |
| 5,964,079 A | 10/1999 | Mellin et al. | | |
| 2001/0003237 A1 * | 6/2001 | Wolters et al. | ................. | 56/64 |

FOREIGN PATENT DOCUMENTS

| | | |
|---|---|---|
| DE | 90 04 204 U1 | 6/1990 |
| EP | 0408090 | 1/1991 |
| GB | 2 059 236 | 4/1981 |

OTHER PUBLICATIONS

AGCO Corporation Windrower Operator's Manual (700721528 D Rev.); Cover page and pp. 44 and 45.
International Search Report of Mar. 30, 2009 re International Application No. PCT/IB2008/003161 (2 pages).

* cited by examiner

*Primary Examiner*—Thomas B Will
*Assistant Examiner*—Mai T Nguyen
(74) *Attorney, Agent, or Firm*—Hovey Williams LLP (57) ABSTRACT

A modular rotary cutter bed is formed by a series of essentially identical cutter modules mounted end-to-end along the length of a common support beam. Guards for the cutters of the modules are arranged such that each guard overlaps and bridges the seam between an adjacent pair of modules so as to increase the structural rigidity of the cutter bed. Each guard is attached at its front end to the noses of a pair of adjacent modules and at its rear end to the support beam to increase structural integrity in all directions. A second embodiment does not utilize a common support beam for the modules but instead relies upon the interconnections between adjacent modules and bridging overlap of the guards to rigidify the cutter bed.

5 Claims, 10 Drawing Sheets

MODULAR ROTARY CUTTERBAR

TECHNICAL FIELD

The present invention relates to rotary mowers and, more particularly, to a modular rotary cutter bed wherein a series of essentially identical cutter modules, each having at least one rotary cutter, are fitted together in side-by-side relationship across the path of travel of the machine.

BACKGROUND AND SUMMARY

Modular cutter beds have been known for some time. Generally speaking, they are formed by connecting a series of essentially identical cutter modules in end-to-end relationship along a support beam in such a manner that the length of the cutter bed is determined by the number of modules in the series. In some constructions, the modules may simply be secured to each other without being secured to a common support beam such that the resulting assembly is self-supporting. In either case, internal drive mechanisms such as operably interconnected spur gears or shafts and bevel gears form a drive train along the bed and provide driving power to all rotary cutters of the bed.

Due to the fact that the cutter bed is comprised of a series of interconnected modules, lines of weakness are inherently presented to some extent at the interfaces or seams between abutting ends of the adjacent modules. Thus, the structural integrity of the bed can be compromised to a certain extent, and reliability issues are presented with respect to the interconnected drive mechanisms between the modules. Each module also has its own rock guard with side edges that end at the seam between adjacent modules. Because these guards do not overlap adjacent modules and interconnect with them, the guards provide no assistance in structurally supporting adjacent modules.

In one conventional arrangement the cutter bed has a scalloped front extremity in which a series of rearwardly projecting notches are interspersed between a series of forwardly projecting arches. This pattern is presented by the rounded noses of the rock guards whose opposite side edges are located at the recessed notches and present fore-and-aft joints at those locations. The cutters of adjacent modules counter-rotate and sweep rearwardly in overlapping paths of travel directly above the notches and joints. Consequently, the cutters tend to drive residue and dirt directly into the joints and can cause it to become tightly wedged in those spaces. A cradle that supports the modules may have grooves worn into it as stubble drags through the joints and into engagement with the cradle.

In the present invention each rock guard is designed to span the seam between a pair of adjacent modules so that it overlaps the two modules and is secured thereto in a bridging relationship to provide improved structural rigidity. Moreover, the butt joint between adjacent guards on the bed is located substantially in fore-and-aft alignment with the axis of rotation of a cutter so that it is remote from the weak point at the seams between adjacent modules and is in a position where any trash or other residue tending to get trapped can be easily severed by a knife of the cutter instead of being allowed to build up and cause harm.

DETAILED DESCRIPTION

The present invention is susceptible of embodiment in many different forms. While the drawings illustrate and the specification describes certain preferred embodiments of the invention, it is to be understood that such disclosure is by way of example only. There is no intent to limit the principles of the present invention to the particular disclosed embodiments.

Figure 1:
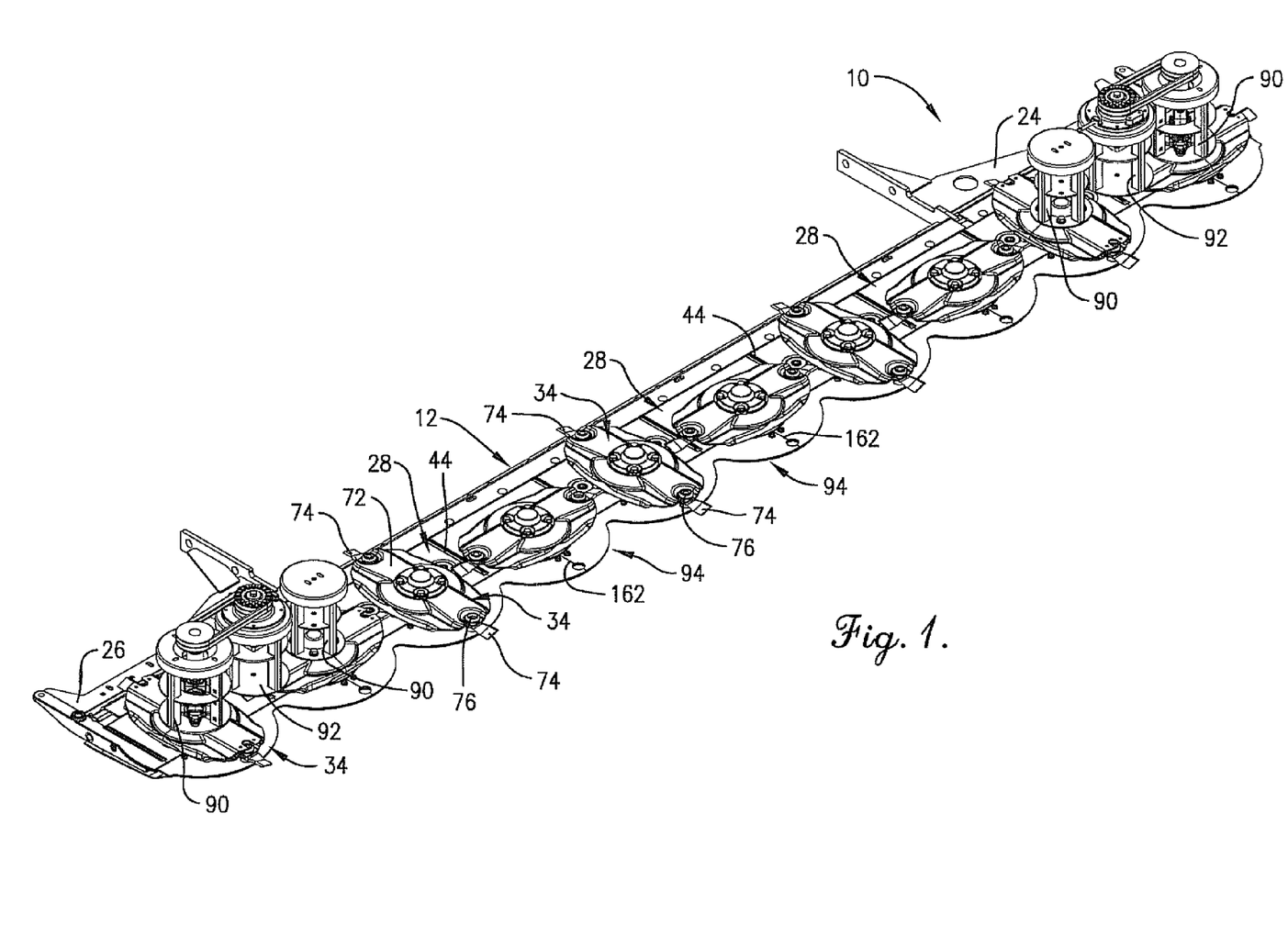
FIG. 1 is a top, right, front isometric view of a modular rotary cutter bed constructed in accordance with the principles of the present invention.
Figure 2:
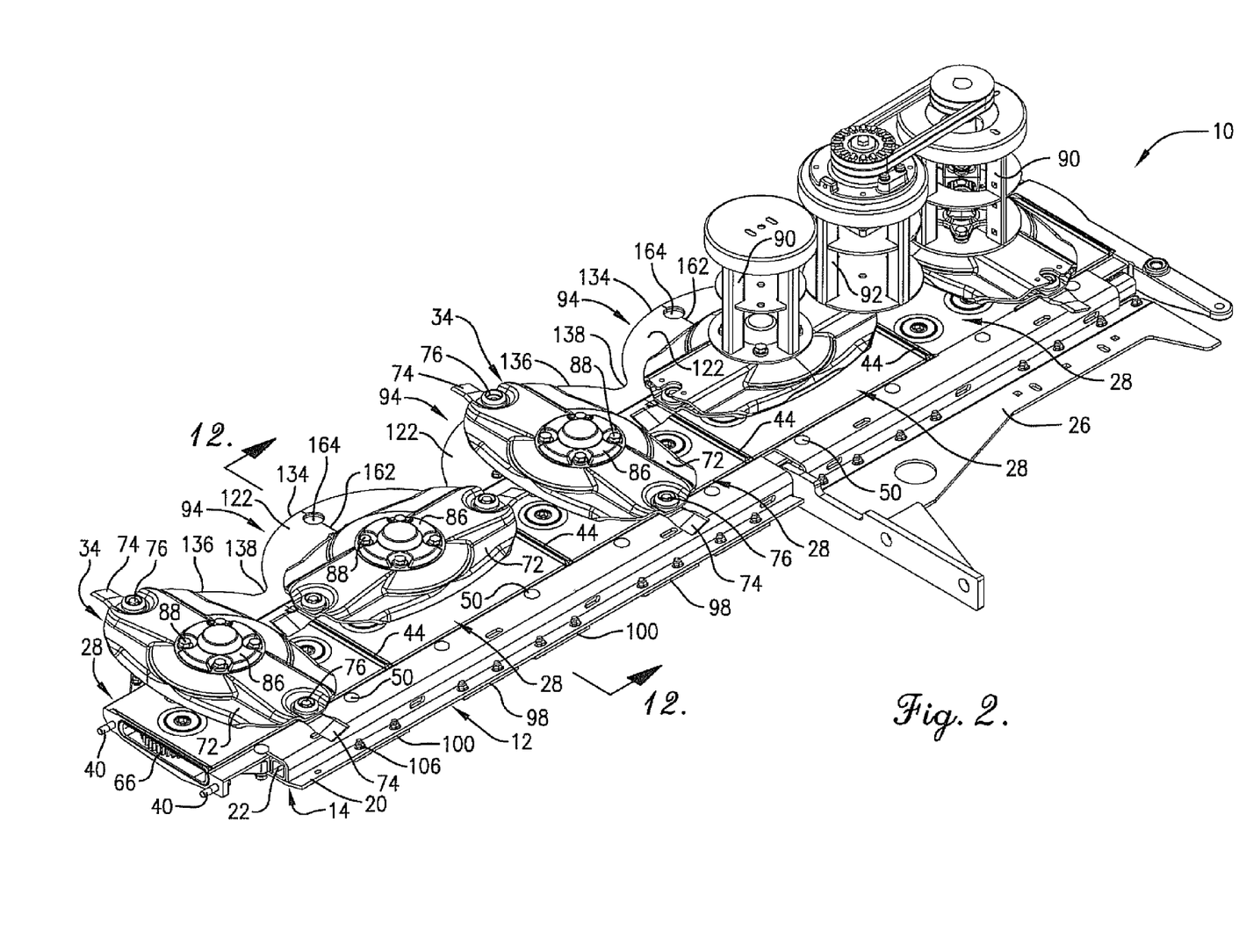
FIG. 2 is an enlarged, fragmentary isometric view of the cutter bed of FIG. 1 taken from a vantage point located behind the cutter bed and with only a portion of the bed being illustrated.

The rotary cutter bed 10 in FIG. 1 is adapted to be attached to support structure (not shown) that renders cutter bed 10 suitable for use as part of a harvesting header, mower or other machine. See, for example, the header in U.S. Pat. No. 6,158,201, which patent is hereby incorporated by reference in its entirety into the present specification. In the embodiment of FIGS. 1-12, a support frame or chassis of cutter bed 10 is defined in part by an elongated beam 12 that normally extends transversely of the path of travel of the mowing machine during use. As illustrated particularly in FIGS. 2, 5 and 12, beam 12 includes a generally reclined h-shaped member 14 having an upper, generally horizontally extending flange 16, a lower generally horizontally extending flange 18 spaced below flange 16, and a rearwardly projecting tail 20 that forms an extension of flange 18. Upper flange 16 is welded to lower flange 18 and tail 20 so as to form a secure weldment. A transversely square tubular member 22 is received within h-shaped member 14 and welded thereto to provide additional structural strength for beam 12. A pair of brackets 24 and 26 adjacent opposite ends of bed 10 are fixed to beam 12 for use in securing beam 12 to structural parts of the mowing machine.

Generally speaking, as illustrated in FIG. 1 a series of essentially identical cutter modules 28 are secured to beam 12 along the length thereof and project forwardly therefrom. In some embodiments (not shown), there may be relatively short "dummy" modules between adjacent cutter modules depending upon the type of internal drive mechanism used for the cutter bed, i.e., short shafts may be housed within such dummy modules to interconnect the drives of adjacent cutter modules. Each module 28 primarily includes a generally rectangular, flat, hollow housing or gear case 30, internal drive mechanism 32 housed within gear case 30, and an external rotary cutter 34 that is positioned outside of and on top of gear case 30 for rotation by drive mechanism 32. It will be appreciated that each of these three major components may be modified in a variety of ways without departing from the principles of the present invention, e.g., drive mechanism 32 may comprise a collection of drive shafts and intermeshing bevel gears instead of the spur gear arrangement illustrated in the preferred embodiment.

Figure 5:
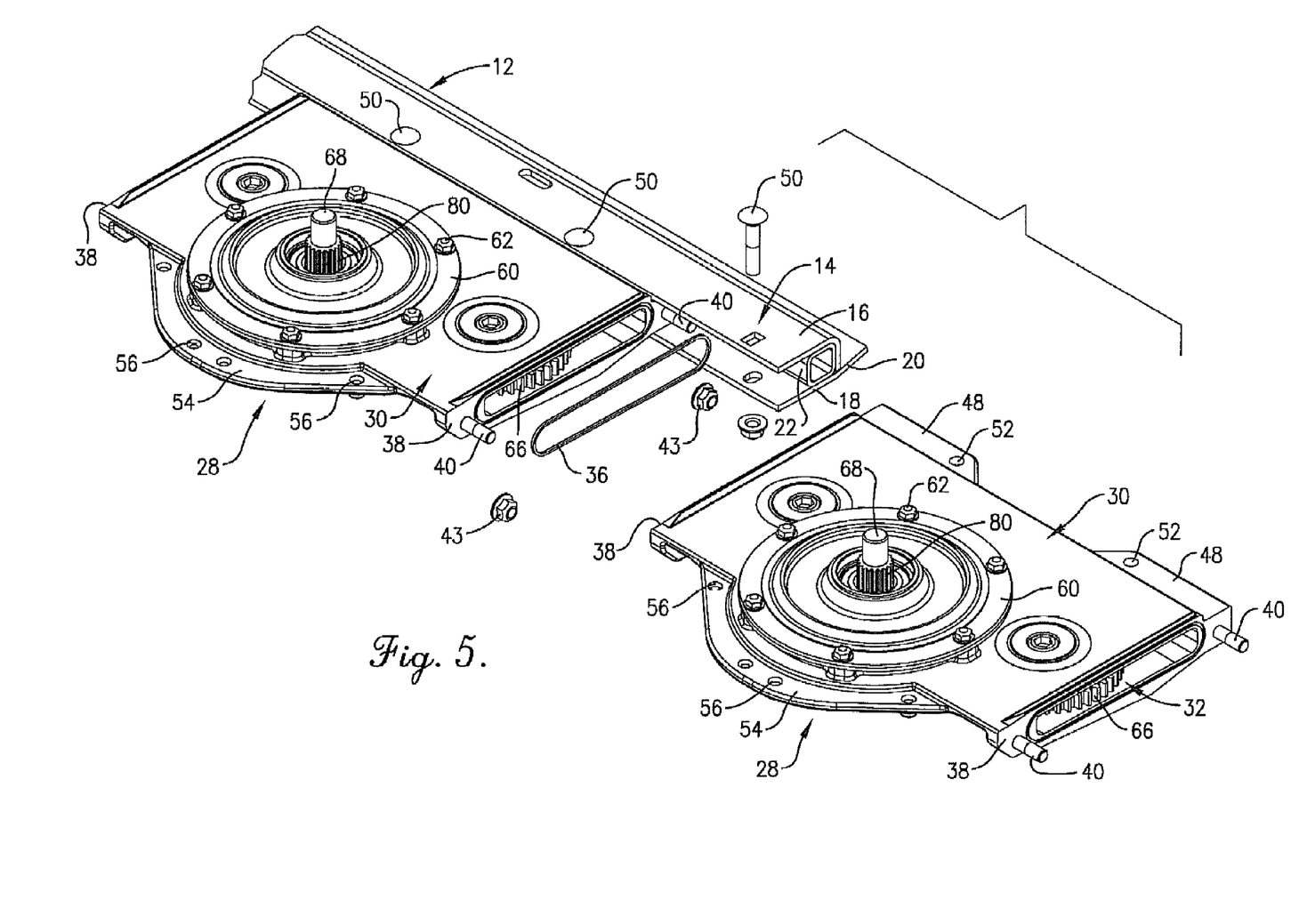
FIG. 5 is a fragmentary, left front isometric view of the cutter bed with a pair of modules separated to reveal details of construction and with the rotary cutters removed.
Figure 6:
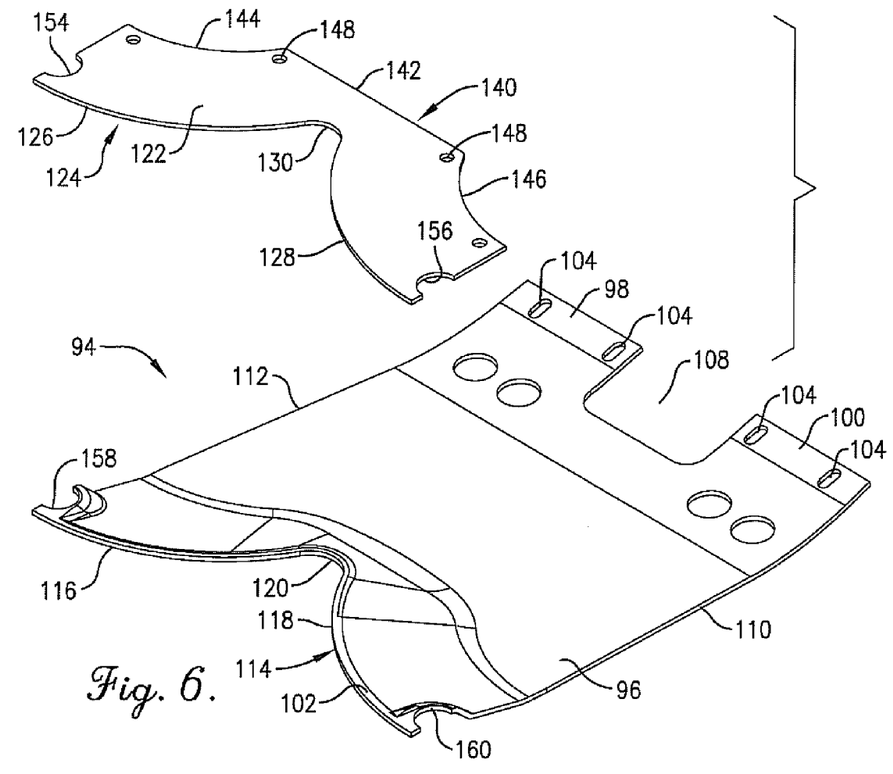
FIG. 6 is a left, front exploded isometric view of a rock guard in accordance with the present invention, the top, forward lip of the guard being illustrated as separated from the bottom pan of the guard to reveal configuration details.
Figure 7:
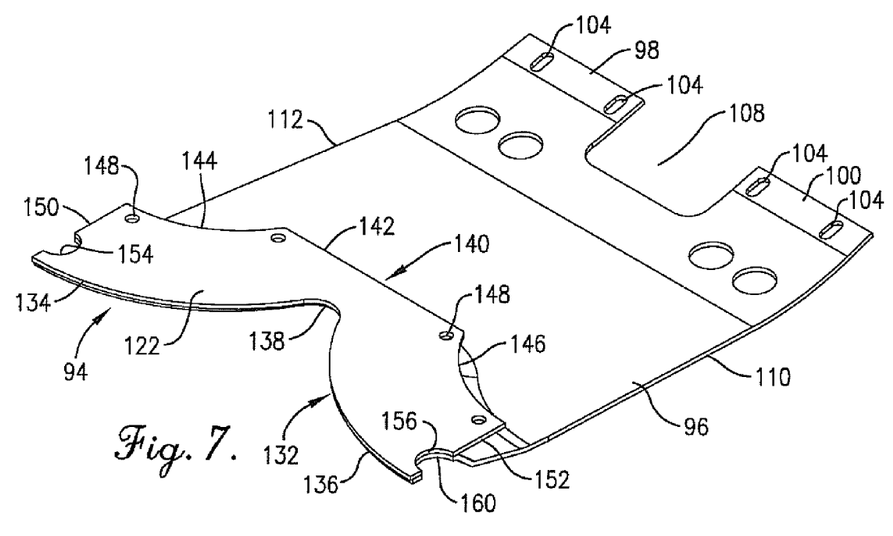
FIG. 7 is a left front isometric view of a guard similar to FIG. 6 but showing the top lip welded in place on the bottom pan in its assembled condition.
Figure 8:
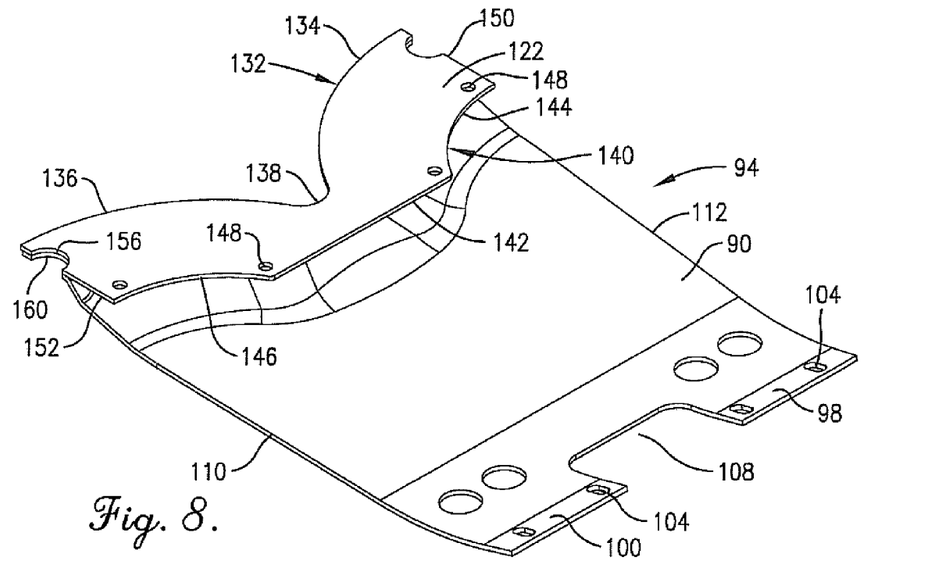
FIG. 8 is a left top isometric view of a guard.
Figure 9:
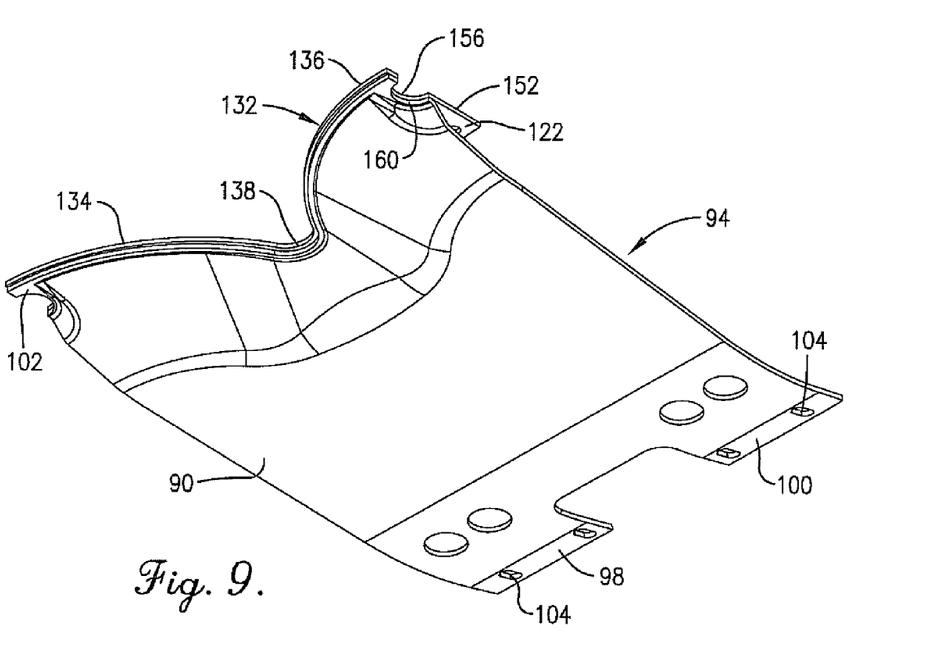
FIG. 9 is a left bottom isometric view of a guard.

Each hollow gear case 30 is open at its opposite ends such that the chamber defined within the gear case communicates with the chambers of adjacent modules when the modules are secured in place along support beam 12. In this way, the interior chambers of the modules can form a reservoir to contain an oil bath for the drive mechanism 32. As illustrated in FIG. 5, a seal 36 may be clamped between each adjacent pair of the gear cases 30 to prevent oil leakage.

Figure 4:
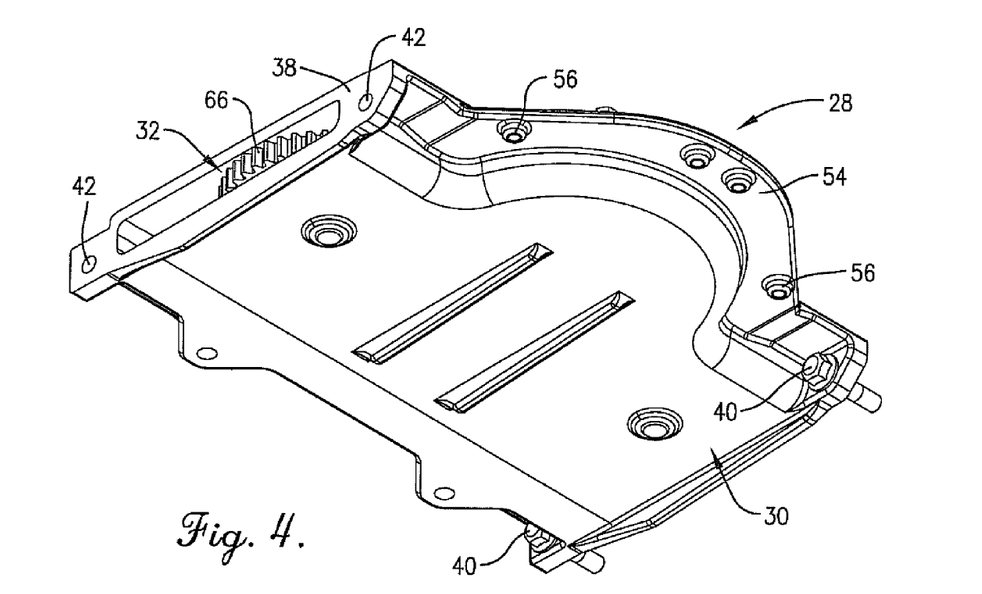
FIG. 4 is a bottom isometric view of the cutter module of FIG. 3.

Each gear case 30 has a pair of opposite flat ends 38. One end 38 has a pair of fastening bolts 40 projecting therefrom (see in particular FIGS. 4, 5), while the opposite end has a pair of through holes 42 for receiving bolts 40 of an adjacent module. Nuts 43 at such opposite end of each gear case 30 may be tightened on bolts 40 to securely fasten adjacent gear cases 30 together. Thus, when all of the modules 28 are butted up against one another along beam 12 and bolts 40/nuts 43 are securely tightened in place, the abutting ends 38 of modules 28 present a series of fore-and-aft extending interfaces or seams 44 along the cutter bed. Each gear case 30 may be provided with a pair of ribs 46 at opposite ends 38 thereof immediately adjacent seams 44 and extending in a fore-and-aft direction along the same to enlarge the surface area against which seals 36 may be compressed.

Figure 10:
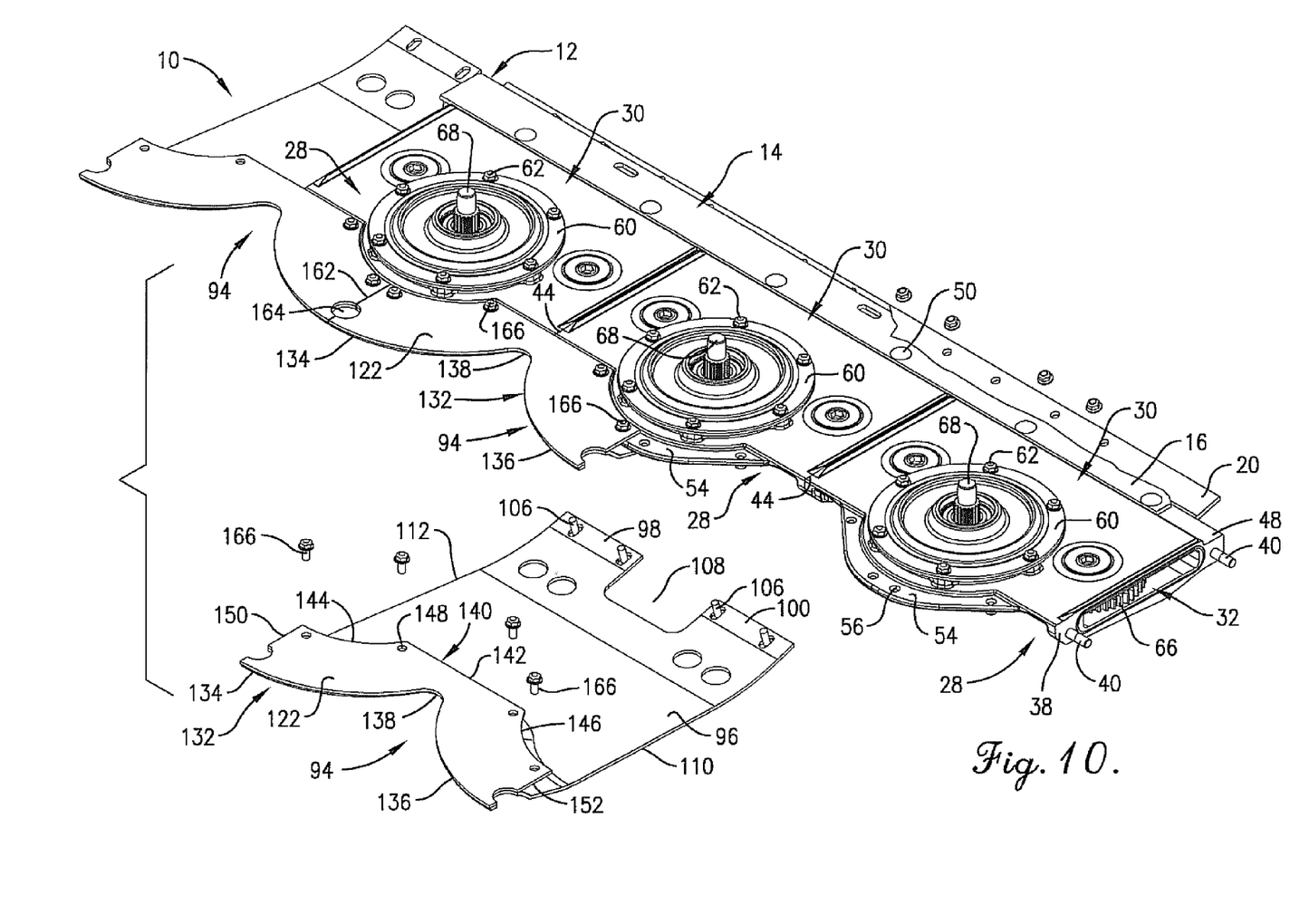
FIG. 10 is a fragmentary, left front isometric view of the bed with the cutters removed and illustrating the manner in which the guards are attached to the modules.
Figure 11:
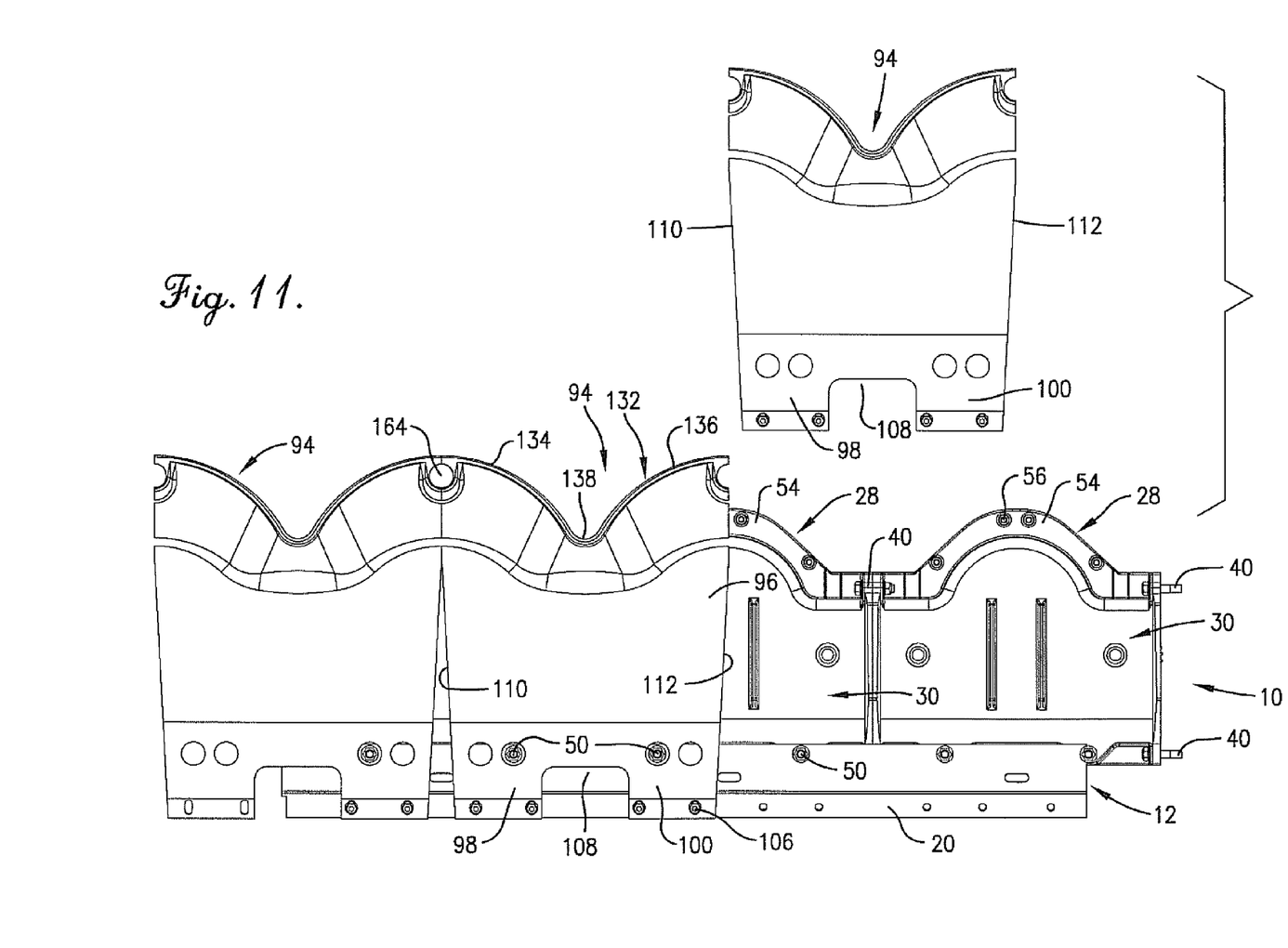
FIG. 11 is a fragmentary bottom plan view of the bed with some of the guards bolted in place and one additional guard removed from its final position to reveal details of construction.
Figure 12:
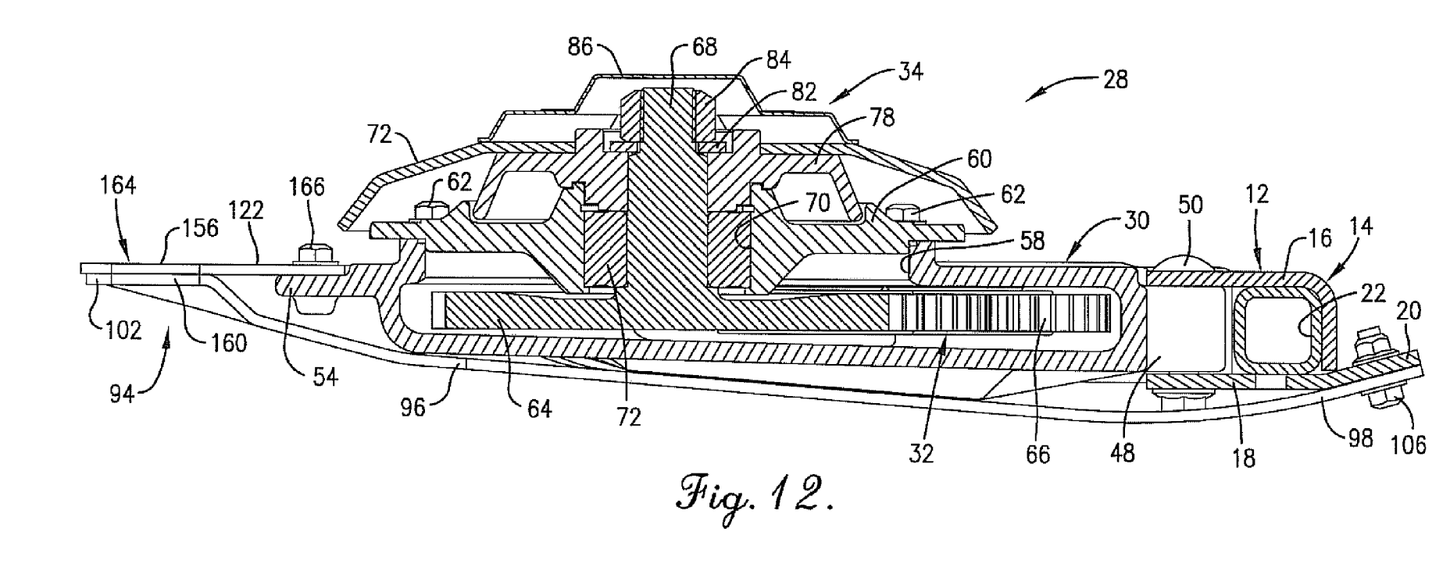
FIG. 12 is a transverse cross-sectional view through the bed taken substantially along line 12-12 of FIG. 2.

Each gear case 30 has a pair of rearwardly projecting mounting ears 48 at spaced apart locations along the rear edge thereof. As shown in FIGS. 5, 10 and 12 ears 48 are adapted to be received between upper and lower flanges 16, 18 of h-shaped member 14. A pair of carriage bolts 50 pass vertically through flanges 16, 18 and receiving holes 52 in ears 48 (FIG. 5) for securely fastening each module 30 to beam 12. At the front of each gear case 30, an arcuate, flange-like nose 54 projects forwardly from the rest of the gear case and is provided with a plurality of mounting holes 56 for use in attaching guards to modules 28 as hereinafter described in more detail. Each gear case 30 also has a centrally disposed circular opening 58 in its top wall as illustrated in FIG. 12, providing access to the interior of the gear case. A circular cover plate 60 overlies each opening 58 and is secured in place by a plurality of removable screws 62.

Figure 3:
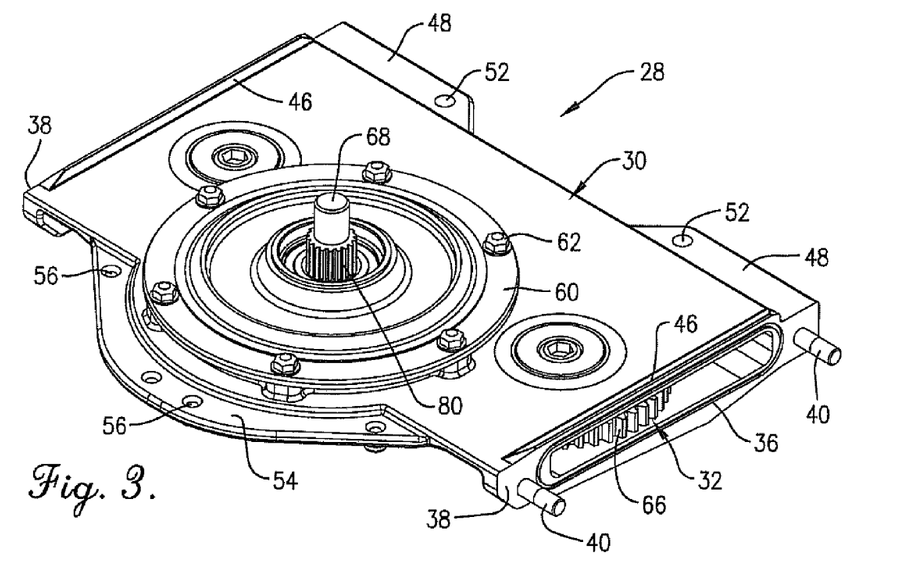
FIG. 3 is an enlarged, top, left, front isometric view of a typical cutter module with the rotary cutter removed to reveal details of construction.

As noted earlier, drive mechanism 32 may take a number of different forms. In the illustrated embodiment, mechanism 32 comprises three spur gears including a large central spur gear 64 (FIG. 12) and a pair of smaller spur gears 66 on opposite sides thereof (see FIGS. 3 and 4). Smaller spur gears 66 mesh with large spur gear 64 so as to transfer driving power to and away from large gear 64. Spur gears 66 project slightly beyond the flat ends 38 of each gear case 30 so that, when modules 28 are bolted in place along beam 12, spur gears 66 of one module intermesh with spur gears of the next adjacent modules to form a complete gear train along the length of cutter bed 10.

In the illustrated embodiment, the eight rotary cutters 34 in the center of cutter bed 10 are intended to be driven in oppositely rotating pairs. Thus, successive large gears 64 along cutter bed 10 have two smaller gears 66 between them to yield the proper direction of rotation. In the event that it is desired for adjacent cutters to rotate in the same direction, an odd number of smaller spur gears 64 would be provided in the gear train between each pair of larger gears 64. In the illustrated embodiment in FIG. 1, it is preferable that the two most outboard rotary cutters 34 at each end of cutter bed 10 rotate inwardly in the same direction so as to convey crops cut by the two most outboard cutters toward the center of the machine (as in the incorporated U.S. Pat. No. 6,158,201). It is within the ambit of the present invention however, that all of the rotary cutters 34 in one half of cutter bed 10 could rotate in the same direction toward the center while all of the rotary cutters in the opposite half of the cutter bed 10 could rotate inwardly toward the center in the opposite direction.

Each large spur gear 64 has an integral, upright shaft 68 that defines the axis of rotation of the particular cutter 34. As illustrated in FIG. 12, each shaft 68 projects upwardly through a bore 70 in the corresponding cover plate 60 and is journaled for rotation by a bushing or bearing set 72.

Each rotary cutter 34 comprises a generally elliptical carrier plate 72 and a pair of free-swinging knives 74 at opposite ends thereof. Each knife 74 is swingably attached to the carrier plate 72 by a pivot bolt 76 so that knife 74 swings out to a radially outwardly directed position during operation as a result of centrifugal force, but can yield if necessary when a hard object is encountered.

As illustrated in FIG. 12, each carrier plate 72 is mounted on a hub 78 that is, in turn, secured to its corresponding shaft 68 by splines 80 on shaft 68 (FIG. 5), a washer 82, and a nut 84. A cap 86 overlies the top end of shaft 68 and nut 84, while a series of screws 88 secure cap 86 and carrier plate 72 to hub 78. The paths of travel of knives 74 of adjacent cutters 34 overlap one another along the line of centers defined by the row of shafts 68, but adjacent cutters 34 are 90° out of phase with one another so that there is no risk of knives 74 of adjacent cutters striking each other.

In the illustrated embodiment, each of the two endmost cutters 34 is provided with an upright, crop conveying cage 90 to help consolidate cut crop inwardly toward the middle of cutter bed 10 during operation. An intermediate conveying cage 92 is also utilized in the illustrated embodiment between the two cages 90 and is supported by overhead structure (not shown). All of the cages 90, 92 rotate in a direction such that their front peripheries are disposed to move crop inwardly toward the middle of cutter bed 10.

Modules 28 are provided with a number of guards 94 along the length of cutter bed 10. Details of construction of each guard 94 are illustrated particularly in FIGS. 6-12. As shown in those figures, each guard 94 has a lower pan or skid 96 that is generally concave in a fore-and-aft direction to present a pair of laterally spaced, slightly upwardly and rearwardly upturned rear tabs 98 and 100 at its rear end and a generally upwardly facing flat margin 102 at its front end. Pan 96 is constructed from sheet metal material and has four bolt holes 104 along the rear thereof in tabs 98, 100 for the purpose of receiving fasteners 106 that attach the rear pan 96 to tail 20 of beam 12. A notch 108 is defined between the two tabs 98, 100 at the rear of each guard 94.

As illustrated in the figures, pan 96 is generally rectangular in overall configuration, although the two opposite side edges 110 and 112 converge slightly toward one another as the rear extremity is approached, following an initial front portion of each edge 110, 112 that is parallel to the opposite edge. The front edge 114 of each pan 96 is scalloped so as to present a pair of forwardly convex sections 116 and 118 on opposite sides of a rearwardly indented central portion that defines a notch 120.

Each guard 94 also includes a top lip 122 having a front edge 124 that is configured in the same manner as front edge of 114 of pan 96. Thus, front edge 124 of each lip 122 has a pair of convexly forwardly curved sections 126 and 128 on opposite sides of a rearwardly indented notch 130. Lip 122 is welded to pan 96 along the interface of lip 122 with the flat margin 102 of pan 96 such that lip 122 projects rearwardly from margin 102 to overhang and be spaced above downwardly inclined regions of pan 96. Front edge 124 of lip 122 and front edge 114 of pan 96 are disposed in vertical registration with one another to provide a front edge 132 on guard 94 that corresponds in shape to front edge 114 of pan 96 and front edge 124 of lip 122, i.e., front edge 132 of guard 94 has a pair of convexly forwardly arcuate segments 134 and 136 on opposite sides of a centrally disposed, rearwardly indented notch 138.

Lip 122 has a rear edge 140 provided with a centrally disposed, straight transverse segment 142 and a pair of forwardly convexly arcuate segments 144 and 146 at opposite ends of straight segment 142 and which are concentric with corresponding front edge segments 134 and 136. A total of four bolt holes 148 are provided along rear edge 140 for mounting purposes as hereinafter explained. Further, opposite side edges 150 and 152 of lip 122 are provided with semi-circular notches 154 and 156 that overlie and are in vertical registration with corresponding semi-circular notches 158 and 160 in pan 96. As will be seen, each superimposed pair of notches 154, 158 and 156, 160 serves to define one-half of an access hole when guard 94 is installed on cutter bed 10.

Guards 94 are installed in such a manner that each of them spans or bridges a corresponding seam 44 between a pair of adjacent modules 28. In other words, instead of each module 28 having its own guard 94, each guard 94 is shared by a pair of adjacent modules 28, i.e., half of each guard 94 overlaps one module while the other half overlaps the next adjacent module. In this relationship, notch 138 of each guard 94 is disposed in fore-and-aft alignment with a corresponding seam 44, while the opposite end edges 150, 152 of each lip 122 are disposed in fore-and-aft alignment with corresponding upright shafts 68 of a pair of adjacent cutters 34. Thus, each lip edge 150 cooperates with the edge 152 of the adjacent guard lip to define a fore-and-aft extending joint 162 between the lips of adjacent guards that is in fore-and-aft alignment with the axis of rotation of the corresponding cutter 34 as defined by the shaft 68. Similarly, the semi-circular notches 154, 158 on one guard 94 cooperate with the semi-circular notches 156, 160 of the next adjacent guard 94 to define an access hole 164 for accessing the underside of pivot bolts 76 of knives 74 for installation and removal purposes.

Lip 122 of each guard 94 overlaps half of the nose 54 of one module 28 and half of the nose 54 of the next adjacent module 28. Bolts 166 pass through holes 148 in lip 122 and holes 56 in nose 54 to thereby secure the front of each guard 94 to the adjacent modules 28. Thus, each guard 94 is secured at its front to the modules 28 by bolts 166 and at its rear to the beam 12 by bolts 104.

While the rear ends of modules 28 are secured to beam 12 by carriage bolts 50, guards 94 add further structural rigidity and support in a fore-and-aft sense to modules 28. Due to the overlapping relationship of guards 94 with seams 44 of the modules, guards 94 also provide increased structural rigidity and support to modules 28 along the length of cutter bed 10. Relative up and down movement between modules 28 is resisted by guards 94.

It will be noted that although the notches 138 of guards 94 are in alignment with seams 44 between modules 28, the joints 162 between adjacent guards 94 are not in alignment with seams 44 or notches 138. Consequently, there is no opportunity for trash and dirt to wedge into areas immediately in front of seams 44, as would be the case if joints 162 were in forward alignment with the seams. This helps reduce the tendency for premature wear and weakening of the cutter bed in the area of seams 44 and notches 138. Extraneous materials that may tend to collect in the vicinity of joints 162 appears to be readily handled by the knives in that area.

Figure 13:
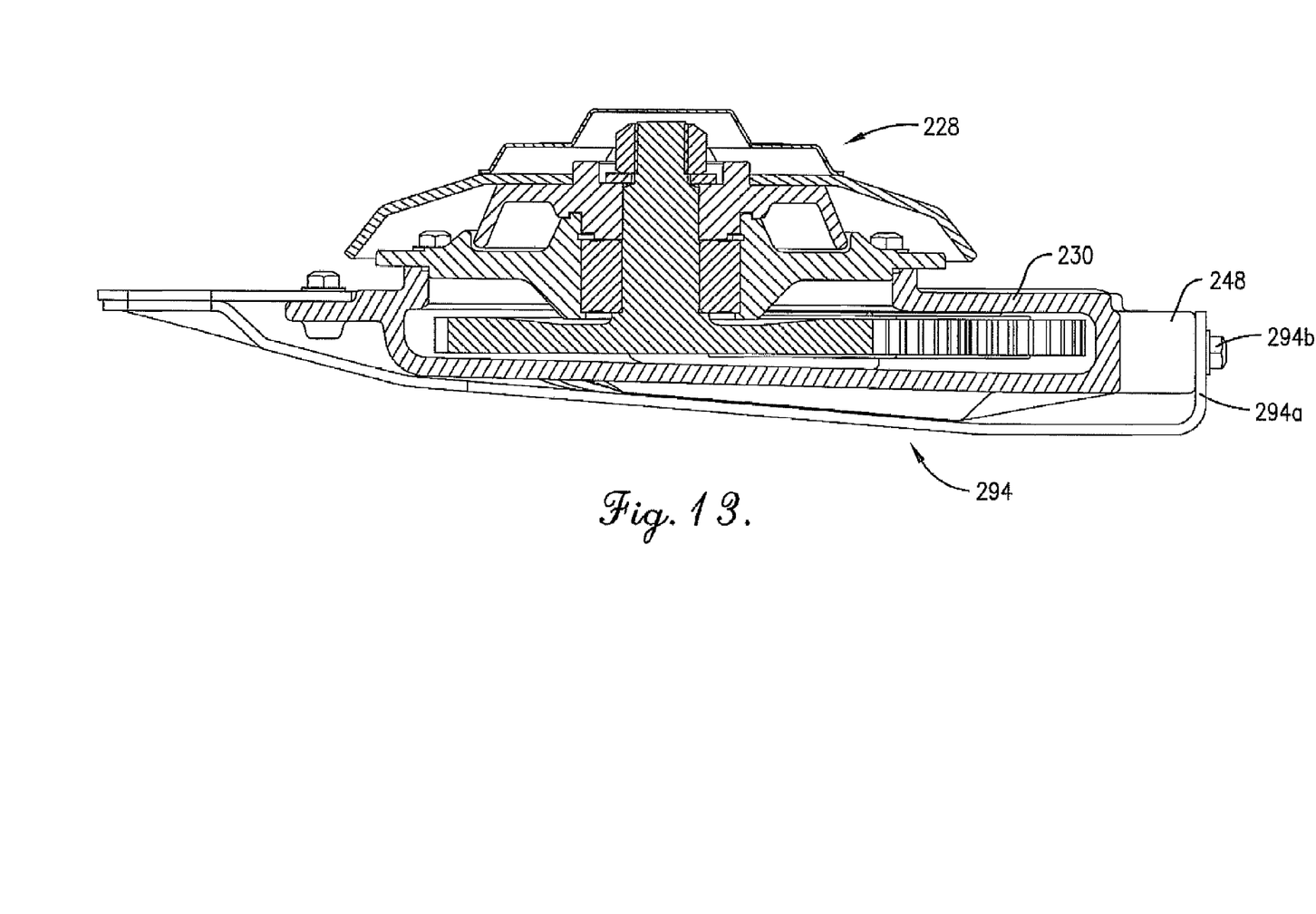
FIG. 13 is a transverse cross-sectional view through a second embodiment of the invention wherein no support beam is utilized and the cutting modules are self-supporting by virtue of their interconnections to and with one another.

FIG. 13 illustrates a second embodiment of the invention wherein the cutter modules are not mounted on a common support beam and instead rely on their interconnections with one another for mutual structural support. The series of cutter modules is thus self-supporting in this respect.

Accordingly, the cutter module 228 and guard 294 of FIG. 13 are identical to cutter module 28 and guard 94 of FIGS. 1-12 except in the way guard 294 is attached to the rear of module 228. In this respect it will be appreciated that guard 294 is slightly shorter than guard 94 in a fore-and-aft direction and has an upturned, rear margin 294a that bears against the rear faces of ears 248 of adjacent gear cases 230. Each guard 294 overlaps and bridges adjacent modules 228 in the same manner as guards 94, and screws 294b (only one being shown) secure rear margin 294a to ears 248 of adjacent modules 228 so as to reinforce and structurally tie adjacent modules together. The front end of each guard 294 is secured to a pair of adjacent modules 228 in the same manner as in the first embodiment.

The inventor(s) hereby state(s) his/their intent to rely on the Doctrine of Equivalents to determine and assess the reasonably fair scope of his/their invention as pertains to any apparatus not materially departing from but outside the literal scope of the invention as set out in the following claims.

The invention claimed is:

1. A modular cutter bed comprising:

a series of interconnected modules provided with individual rotary cutters having upright axes of rotation, each module having a pair of opposite ends abutting the ends of adjacent modules to present a series of fore-and-aft seams along the cutter bed between the modules; and a series of guards presenting a substantially continuous, scalloped front extremity of the cutter bed comprised of alternating convex segments and concave notches wherein the notches are aligned with the seams between adjacent modules and the convex segments are aligned with the axes of rotation of the cutters, each guard spanning the seam between a pair of adjacent modules and being secured to both modules of the pair, adjacent guards in the series having fore-and-aft side edges disposed adjacent one another in the convex segments of the front extremity of the cutterbed to present fore-and-aft joints that are located in the convex segments in front of the axes of rotation of the cutters, said guards being devoid of fore-and-aft edges in the concave notches of the front extremity of the cutterbed such that the notches are joint-free in front of the seams between adjacent modules.

2. A modular cutter bed as claimed in claim 1, each guard comprising a generally fore-and-aft concave lower pan having a front end projecting forwardly beyond the front of a pair of adjacent modules and a generally flat upper lip projecting rearwardly from the front end of the lower pan into overlapping relationship with the modules, said lip being secured to the modules in the region of overlap of the lip with the module.

3. A modular cutter bed as claimed in claim 1, further comprising an elongated support beam, said modules being secured to the support beam along the length thereof and projecting forwardly therefrom.

4. A modular cutter bed as claimed in claim 3, said guards being secured to said beam and to the modules.

5. A modular cutter bed as claimed in claim 4, each guard comprising a generally fore-and-aft concave lower pan having a front end projecting forwardly beyond the front of a pair of adjacent modules and a generally flat upper lip projecting rearwardly from the front end of the lower pan into overlapping relationship with the modules, said lip being secured to the modules in the region of overlap of the lip with the modules.

* * * * *